United States Patent [19]

Agarwal et al.

[11] 4,362,828
[45] Dec. 7, 1982

[54] HOT MELT ADHESIVE COMPOSITIONS

[75] Inventors: Pawan K. Agarwal, Westfield; Warren A. Thaler, Aberdeen, both of N.J.

[73] Assignee: Exxon Research and Engineering Co., Florham Park, N.J.

[21] Appl. No.: 323,420

[22] Filed: Nov. 20, 1981

[51] Int. Cl.$^3$ .............................................. C08L 95/00
[52] U.S. Cl. .................................... 524/66; 524/70; 524/71; 524/284; 524/394; 524/398; 524/399; 524/400; 524/211; 524/236; 524/425; 524/445; 524/451
[58] Field of Search .................. 524/66, 70, 71, 284, 524/394, 398, 399, 400, 211, 236, 425, 445, 451

[56] References Cited

U.S. PATENT DOCUMENTS 4,158,688 6/1979 Pett et al. .............................. 524/70
4,217,259 8/1980 Bresson .................................. 524/66

*Primary Examiner*—Melvyn I. Marquis
*Attorney, Agent, or Firm*—Richard E. Nanfeldt

[57] ABSTRACT

This invention relates to hot melt adhesive compositions which include a neutralized EPDM terpolymer which has about 5 to about 50 meq. of neutralized sulfonate groups per 100 grams of the neutralized sulfonated elastomeric EPDM terpolymer, a neutralized sulfonated 1,2-syndiotactic polybutadiene resin which has about 5 to about 50 meq. of neutralized sulfonate groups per 100 grams of the neutralized sulfonated polybutadiene, and about 25 to about 250 parts by weight of a hydrocarbon resin of a petroleum or coal tar distillate having about 5 to about 6 carbon atoms the hydrocarbon resin being composed of aliphatic dienes and monoolefins per 100 parts by weight of the neutralized sulfonated EPDM terpolymer.

11 Claims, No Drawings

HOT MELT ADHESIVE COMPOSITIONS

BACKGROUND OF THE INVENTION

1. Field of the Invention

This invention relates to hot melt adhesive compositions which include a neutralized EPDM terpolymer which has about 5 to about 50 meq. of neutralized sulfonate groups per 100 grams of the neutralized sulfonated elastomeric EPDM terpolymer, a neutralized sulfonated 1,2-syndiotactic polybutadiene resin which has about 5 to about 50 meq. of neutralized sulfonate groups per 100 grams of the neutralized sulfonated polybutadiene, and about 25 to about 250 parts by weight of a hydrocarbon resin of a petroleum or coal tar distillate, having about 5 to about 6 carbon atoms the hydrocarbon resin being composed of aliphatic dienes and monoolefins per 100 parts by weight of the neutralized sulfonated EPDM terpolymer.

Broadly speaking, synthetic adhesives used in packaging can be classified into four categories: water-based, solvent-based, reactive and hot melt adhesives. Of these four, currently the water-based are used most extensively. Usually, the water-based adhesives are based on emulsion polymers and are applied to porous cellulosic substrates. Energy from the outside in some fashion is applied to the system to evaporate the water in order that a strong bond may be formed. Beside this energy requirement for the formation of the bond, there is another complication with the use of water-based adhesive. For a uniform coating, a good uniform wetting of the substrate surface is desired, which is not easily achieved.

With the solvent-based adhesives, usually a good wetting is achieved; however, their use has been becoming extremely restrictive due to expensive energy requirements for the evaporation of organic solvents fire hazards associated with the use of these organic solvents and emissions problems with said solvents. The strict government environmental regulations and restrictions concerning worker's exposure to solvent vapors, etc., has placed extra pressure on the packager to use nonsolvent-based adhesives.

Recently, the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification, a strong and durable bond is formed.

The key requirements of resins suitable for hot melt adhesive applications are that they should have good physical properties, e.g., tensile strength, etc., at ambient conditions, and they can flow easily at fabrication temperatures. The ethylene vinyl acetate (EVA) copolymers and styrene block copolymers, such as Kraton, have been extensively used as hot melt adhesives; however, their use has been limited largely to pressure sensitive adhesives.

There is a significant demand in the market today for polymer systems which exhibit good green strength or tensile properties at ambient temperatures which, when heated to a predetermined temperature, will give good flow such that they may be applied to a coating or substrate by melt extrusion or other suitable techniques. In the past, it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

The incorporation of the sulfonated 1,2-syndiotactic polybutadiene into the hot melt adhesive composition improves the compatability of the neutralized sulfonated EPDM terpolymer with various compounding ingredients, typically used in various adhesive and thermoplastic applications.

2. Prior Art

Several U.S. Patents have described sulfonated polymers such as sulfonated Butyl and sulfonated EPDM in adhesive applications (e.g., U.S. Pat. No. 3,867,247 and U.S. Pat. No. 3,801,531). It is important to distinguish the instant invention over those prior art systems. The former patent is directed at a sulfonated Butyl cement which is solvent based and is employed to laminate various substrates. It is important to note that the instant invention differs dramatically from that patent as follows:

(a) The adhesives of the instant invention are not deposited from solvents but are hot melt and require no solvents in their preferred method of utilization.

(b) The instant invention may optionally include a preferential plasticizer capable of associating with the metal sulfonate groups and thereby reducing the melt viscosity of the resulting blends to make the systems more processable.

(c) The instant invention is directed at sulfonated ethylene propylene terpolymers or sulfonated EPDM, whereas most of the prior art deals with sulfonated Butyl rubber (e.g., U.S. Pat. No. 3,867,247).

With regard to the latter point, historically, EPDM systems do not possess good tack properties and substantial art exists directed towards improving the adhesive characteristics of such systems. This problem becomes even more acute when EPDM is sulfonated to levels of 5 to 50 meq. per 100 grams of polymer and neutralized. The resulting compositions have been widely used as the basis for thermoplastics elastomers (i.e., U.S. Pat. Nos. 4,157,992; 4,014,831, etc.). The use of these materials in such applications is, in part, a demonstration that the properties of such materials are just the opposite of those desired for adhesive. In fact, such materials are remarkably devoid of tack or adhesion. The task, therefore, of converting such physically cross-linked materials into suitable adhesive candidates is a particularly challenging one for three reasons: (a) the crystalline 1,2-syndiotactic polybutadiene and EPDM backbone are particularly unsuited for that purpose, both being very dry elastomers; (b) the syndiotactic polybutadiene has relatively high Tg (~25° C.); (c) the strong associations attributable to metal sulfonate cross-links further inhibit adhesion to any particular substrate.

Despite these handicaps, there are some very good reasons for solving the problems associated with converting sulfonated EPDM when used in conjunction with sulfonated 1,2-syndiotactic polybutadiene into a good hot melt adhesive composition. The excellent thermal stability inherent in the EPDM backbone is a very desirable property for adhesives which will be exposed to high temperatures for long times. Most adhesives based on other elastomeric backbones can suffer degradation under those conditions. The crystallinity and high Tg of the polybutadiene impart rigidity and cohesive strength to the adhesive composition.

SUMMARY OF THE INVENTION

This invention relates to hot melt adhesive compositions which include a neutralized EPDM terpolymer, which has about 5 to about 50 meq. of neutralized sulfonated EPDM terpolymer, a neutralized sulfonated 1,2-syndiotactic polybutadiene resin, which has about 5 to about 50 meq. of neutralized sulfonate groups per 100 grams of the neutralized sulfonated polybutadiene, and about 25 to about 250 parts by weight of a hydrocarbon resin of a petroleum or coal tar distillate, having about 5 to about 6 carbon atoms the hydrocarbon resin being composed of aliphatic dienes and monolefins per 100 parts by weight of the neutralized sulfonated EPDM terpolymer.

GENERAL DESCRIPTION

The present invention relates to unique and novel hot melt adhesive compositions which comprise a blend of a neutralized sulfonated EPDM terpolymer, a neutralized sulfonated 1,2-syndiotactic polybutadiene resin and a hydrocarbon resin, wherein an ionic preferential plasticizer oil, and/or a filler can be optionally added to the compositions, thereby modifying the rheological and physical properties of the hot melt adhesive compositions.

A. Sulfonated EPDM terpolymer and Process for Forming

The neutralized sulfonated EPDM terpolymers of this present instant invention are derived from unsaturated EPDM terpolymers.

EPR or EPDM polymers are known in the rubber industry as very dry rubbers meaning that they are relatively non-tacky, and indeed are very limited in adhesive applications for that reason. Therefore, the instant invention is specifically attractive for sulfonated EPDM systems in that these materials possess a very high degree of ionic cross-linking which can be controlled by plasticization yet can be modified with the blends taught herein to have good adhesive qualities. This combination of good adhesion and adequate tensile properties is highly sought in a number of adhesive applications, yet is particularly difficult to achieve with the sulfonated ethylene propylene terpolymers. This invention will describe how such elastomers can be blended to achieve some of these desirable properties.

The EPDM terpolymers are low unsaturation polymers having about 1 to about 10.0 wt. % olefinic unsaturation, more preferably about 2 to about 8, most preferably about 3 to 7 defined according to the definition as found in ASTM D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 50 wt. % ethylene and about 1 to about 10 wt. % of diene monomer, the balance of the polymer being propylene. Preferably, the polymer contains about 45 to about 65 wt. % ethylene, more preferably 45 to 60 wt. % e.g., 50 wt. % and about 2.6 to about 8.0 wt. % diene monomer, e.g., 5.0 wt. %. Such EPDM polymers are substantially non-crystalline meaning they possess less than 20% crystallinity as determined by X-ray techniques. The diene monomer is preferably a nonconjugated diene. Illustrative of these nonconjugated diene monomers which may be used in the terpolymer (EPDM) are 1,4-hexadiene, dicyclopentadiene, 5-ethylidene 2-norbornene, 5 methylene-2-norbornene, 5-propenyl-2-norbornene, and methyl tetrahydroindene. A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174,000. Another EPDM terpolymer Vistalon 2504-20 is derived from Vistalon 2504 (Exxon Chemical Co.) by a controlled extrusion process, wherein the resultant Mooney viscosity (ML, 1+8, 212° F.) is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000. Nordel 1320 (DuPont) is another terpolymer having a Mooney viscosity (ML, 1+8, 212° F.) of about 25 and having about 53 wt. % of ethylene, about 3.5 wt. % of 1,4-hexadiene, and about 43.5 wt. % of propylene.

Another EPDM terpolymer Vistalon (MD-76-5) is a terpolymer having a Mooney viscosity (ML, 1+8, 212° F.) of about 20, and $\overline{M}n$ as measured by GPC of about 60,000 and a wt. % ethylene content of about 55.

The EPDM terpolymers of this invention have a number average molecular weight ($\overline{M}n$) as measured by GPC of about 10,000 to about 200,000, more preferably of about 15,000 to about 100,000, and most preferably of about 20,000 to about 60,000. The Mooney viscosity (ML, 1+8, 212° F.) of the EPDM terpolymer is about 5 to about 60, more preferably about 10 to about 50, most preferably about 5 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

The sulfonated EPDM terpolymers are formed by dissolving the elastomeric polymer in a nonreactive solvent such as chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric EPDM terpolymer nonreactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, incorporated herein by reference. The sulfonating agents are selected from the group consisting of an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred solution agent for this invention is an acyl sulfate selected from the group consisting of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the EPDM terpolymer backbone. The reaction is quenched with an aliphatic alcohol such as methanol, ethanol or isopropanol, with an aromatic hydroxyl compound, such as phenol, as cycloaliphatic alcohol such as cyclohexanol or with water. The sulfonated EPDM terpolymer has about 5 to about 50 meq. sulfonate groups per 100 grams of sulfonated polymer, more preferably about 5 to about 40; and most preferably about 7 to about 20. The meq. of sulfonate groups per 100 grams of polymer is determined by both titration of the polymeric sulfonic acid and Dietert Sulfur analysis. In the titration of the sulfonated polymer, the polymer is dissolved in solvent consisting of 95 parts of toluene and 5 parts of methanol at a concentration level of 50 grams per liter of solvent. The sulfonated EPDM terpolymer is titrated with ethanolic sodium hydroxide to an Alizarin-Thymolphthalein end point.

The sulfonated EPDM terpolymer is gel-free and hydrolitically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

Neutralization of the sulfonated EPDM terpolymer is done by the addition of a solution of a basic salt to the unneutralized sulfonated EPDM terpolymer dissolved in the mixture of the aliphatic alcohol and nonreactive solvent. The basic salt is dissolved in a binary solvent system consisting of water and/or an aliphatic alcohol. The counterion of the basic salt is selected from the group consisting of a carboxylic acid having from about 1 to about 4 carbon atoms, a hydroxide, or alkoxide having about 1 to about 4 carbon atoms, and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the unneutralized sulfonate groups, more preferably about 98%, most preferably 100%. Examines of metal oxides useful in preparing metal sulfonates are MgO, CaO, BaO, ZnO, $Ag_2O$, $PbO_2$ and $Pb_3O_4$. Useful examples of metal hydroxides are NaOh, KOH, LiOH, $Mg(OH)_2$ and $Ba(OH)_2$. Alternatively, the unneutralized sulfonated EPDM terpolymer can be neutralized with an organic amine, such as described in U.S. Pat. No. 3,642,728, which is incorporated herein by reference.

B. Sulfonated 1,2-Syndiotactic Polybutadiene and Process for Forming

In general, the process for forming a gel-free sulfonated 1,2-syndiotactic polybutadiene is dependent upon the use of an acetyl sulfate sulfonating agent which is free of residual sulfuric acid. The use of an acetyl sulfate sulfonating agent which contains residual sulfuric acid will cause gelation of the 1,2-syndiotactic polybutadiene during the sulfonating process. The instant invention process for the sulfonation of the 1,2-syndiotactic polybutadiene comprises the steps of: reacting anhydrous acetic anhydride with concentrated sulfuric acid to form an acetyl sulfate which is free of residual sulfuric acid, wherein the volume ratio of the acetic anhydride to sulfuric acid is about 1/1 to about 10/1, more preferably about 1.2/1 to about 2/1, dissolving the formed acetyl sulfate in a critically selected solvent to form a solution of the acetyl sulfate; adding the solution of the acetyl sulfate to a cement of the 1,2-syndiotactic polybutadiene at a sufficient temperature and for a sufficient period of time to effect sulfonation; quenching the cement of the sulfonated 1,2-syndiotactic polybutadiene, and recovering the sulfonated 1,2-syndiotactic polybutadiene from the cement.

The 1,2-syndiotactic polybutadiene which are useful in the instant application have a molecular weight as measured by GPC of about 20,000 to above 100,000. An especially useful 1,2-syndiotactic polybutadiene is distributed by UniRoyal and designated as RB-820 and has an Mn as measured by GPC of above 100,000 and 1,2 unit content of about 92% and a degree of crystallinity of about 25%. Other examples of useful syndiotactic 1,2 polybutadiene include UniRoyal's RB-810 and RB-830 with 90 and 93% 1,2-content and 18 and 29% crystallinity, respectively.

The cement of the 1,2-syndiotactic polybutadiene is formed by dissolving of 1,2-syndiotactic polybutadiene in a critically selected solvent which is selected from the group consisting of methylene chloride, and dichloroethane, wherein methylene chloride is preferred. Non-halogenated aliphatic and aromatic hydrocarbons are not useful in the instant process due to solubility problems with respect to the acetyl sulfate which is being added to the cement. The concentration of the 1,2-syndiotactic polybutadiene in the cement is about 2 to about 40 grams/100 ml of solvent, more preferably about 5 to about 25, and most preferably about 10 to about 20.

The acetyl sulfate which is free of residual sulfuric acid is formed by the reaction of anhydrous acetic anhydride with concentrated sulfuric acid at a temperature of about $-50°$ to about 50° C., more preferably about $-25$ to about 35 and most preferably about $-10$ to about 25 for a period of time of about 1 to about 60 min., more preferably about 5 to about 30 min., and most preferably about 5 to about 15 min. The concentrated sulfuric (96%) acid is added slowly with stirring to the anhydrous acetic anhydride in a vessel until the contents are homogeneous. The resultant acetyl sulfate, which is free of residual sulfuric acid, is diluted with the anhydrous methylene chloride thereby forming a solution of the acetyl sulfate, wherein the concentration of the acetyl sulfate is about 1 to about 50 grams/100 ml of methylene chloride, more preferably about 5 to about 30 and most preferably about 10 to about 20.

The solution of the acetyl sulfate is added slowly to the stirred cement of 1,2-syndiotactic polybutadiene at a temperature of about $-50°$ C. to about 40° C., more preferably about $-10°$ C. to about 30° C., and most preferably about 20° C. to about 30° C. Upon the completion of the addition of the acetyl sulfate to the cement of the 1,2-syndiotactic polybutadiene, the sulfonation reaction is terminated after about 5 to about 120 minutes, more preferably about 10 to about 60, and most preferably about 15 to about 45 by the addition of a quenching agent to the cement of the sulfonated polybutadiene.

The quenching agent can be an aliphatic alcohol such as methanol, ethanol, isopropanol; and aromatic hydroxyl compound such as phenol; a cycloaliphatic alcohol such as cyclohexanol or with water.

The unneutralized sulfonated polybutadiene polymer has about 5 to about 100 meq. sulfonate groups per 100 grams of sulfonated 1,2 polybutadiene polymer, more preferably about 10 to about 40, and most preferably about 12 to about 35. The meq. of sulfonate groups/100 grams of polymer is determined by both titration of the polymeric sulfonate and Dietert Sulfur analysis. In the titration of the sulfonate, the polymer is dissolved in solvent consisting of 95 parts of toluene and 5 parts of methanol at a concentration level of 50 grams per liter of solvent. The sulfonation polymer is titrated with ethanolic sodium hydroxide.

The unneutralized sulfonated polymer is gel-free and hydrolytically stable. Gel is measured by stirring a given weight of polymer in a solvent comprised of 95 toluene/5 methanol at a concentration of 5 wt. % for 24 hours, allowing the mixture to settle, withdrawing a weighed sample of the supernatant solution and evaporating to dryness.

Hydrolytically stable means that the acid function in this case the sulfonic acid, will not be eliminated under neutral or slightly basic conditions to a neutral moiety which is incapable of being converted to highly ionic functionality.

Neutralization of the unneutralized sulfonated 1,2-polybutadiene polymer is done by the addition of a solution of a basic salt to the unneutralized sulfonated polybutadiene polymer dissolved in the mixture of the aliphatic alcohol and nonreactive halogenated solvent system or alternatively neutralization can be readily effected by employing ammonia or a primary, secondary or tertiary aliphatic amine or an aromatic amine or a quaternary ammonium base. The basic salt is dissolved in a binary solvent system consisting of water and/or aliphatic alcohol. The counterion of the basic salt is selected from the group consisting of ammonium, antimony, aluminum, lead and Groups IA, IIA, IB or IIB of the Periodic Table of Elements and mixtures thereof. The anion of the basic salt is selected from the group consisting of a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the unneutralized sulfonated polymer to effect neutralization. It is preferable to neutralize at least 95% of the sulfonate groups, more preferably about 98%, most preferably about 100%. Ammonia or amines may be added either in a liquid or gaseous form or in a solvent such as an alcohol.

The neutralized sulfonated 1,2-syndiotactic polybutadiene is incorporated into the hot metal adhesive composition at about 25 to about 250 parts by weight per 100 parts by weight of said neutralized sulfonated EPDM terpolymer, more preferably about 50 to about 200, and most preferably about 50 to about 150.

B. Plasticizers

The metal sulfonate containing polymers at higher sulfonate levels can possess extremely high melt viscosities and are thereby difficult to process. The optional addition of ionic group (preferential) plasticizers markedly reduces melt viscosity and frequently enhances physical properties. To the neutralized sulfonated EPDM terpolymer is added, in either solution or to the crumb of the sulfonated EPDM terpolymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Peroidic Table of Elements and mixtures thereof. The carboxylic acids are selected from the group consisting of lauric, myristic, palmitic or stearic acids and mixtures thereof, e.g., zinc stearate, magnesium stearate, or zinc laurate.

The preferential plasticizer is incorporated into the hot melt adhesive composition at about 1 to about 50 parts by weight based on 100 parts by weight of the neutralized sulfonated EPDM terpolymer, more preferably at about 2 to about 25 and most preferably at about 3 to about 20. The metallic salt of the carboxylic acid can also be used as neutralizing agent. In the case of the neutralizing agent and plasticizer being the identical chemical species, additional metallic salt is added over the required levels of neutralization. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof. The resultant neutralized sulfonated elastomeric polymer with preferential plasticizer is isolated from the solution by conventional steam stripping and filtration.

C. Commerical Tackifier Resins

To the hot melt adhesive composition is added a commercial tackifying resin having a softening point of about 0° to about 160° C., more preferably about 50° to 140° C. and most preferably about 70° to 120° C. A variety of commercial tackifier resins are available. Some of these resins contain α and/or β pinene base polyterpene resins as the main ingredient while others are derived from the polymerization of petroleum or coal distillates which consist of aliphatic dienes, mono- and diolefins and cyclic olefins having about 5 to about 6 carbon atoms. The latter type of tackifiers having primarily piperlene and/or isoprene structure. A general but excellent description of tackifying resins derived from Petroleum derivatives can be found in, for example *Encyclopedia of Polymer Science and Technology*, Vol. 9, Pages 853 to 860, chapter by John Findlay, Published by John Wiley & Sons, NY (1968).

Typical but nonlimiting tradenames of these commercial tackifiers are Wingtak of Goodyear, Escorez of Exxon, Piccolyte of Hercules and Zonrez of Arizona Chemicals. Recently these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous. The number average molecular weight $\overline{M}n$ as measured by GPC can be from about 300 to about 5000 and more preferably about 500 to about 2000 and most preferably about 700 to 1600.

As well-known to those familiar with the use of tackifying resins, because of their wide range compatibility, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 250 parts by weight per 100 parts by weight of the neutralized sulfonated EPDM terpolymer, more preferably about 30 to about 125 and most preferably about 35 to about 100.

D. Method of Forming Blend Adhesive Composition

The blend compositions of the neutralized sulfonated elastomeric polymers of EPDM terpolymer and polybutadiene with or without preferential plasticizer and the hydrocarbon tackifier resin can be formed by techniques well-known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrell Continuous Mixer, a twin screw extruder, or tandem extrusion techniques which are continuous mixing types of equipment. The Banbury mixing device is the preferred batch type mixer, and the twin screw extruder is the preferred continuous mixer.

E. Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at about 1 to about 150 parts by weight per 100 parts by weight of the neutralized sulfonated EPDM terpolymer, more preferably at about 20 to about 150; and most preferably at about 30 to about 100. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in ths invention are illustrated in Table I.

F. Oil Extended Adhesive Compositions

It is observed that the blend composition of the instant invention can also include oils to further improve low temperature properties and tack characteristics of the resulting adhesive levels of oil of less than about 50 parts by weight per 100 parts of the neutralized sulfonated EPDM terpolymer rubber can be incorporated, more preferably about 1 to about 25 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffinic petroleum oils, having less than 2 weight percent polar type compounds. Typical oils are illustrated in Table II.

TABLE I

| Filler | Code # | Oil Absorption Grams of oil/100 Grams of Filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

TABLE II

| Type Oil | Oil Code # | Viscosity ssu | $\overline{M}n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

G. Method of Fabrication of Adhesive Compositions

Because of the significant advances in the packaging technology, the hot melt adhesive compositions can be used by conventional polymer fabricating techniques. After the blending is complete, the adhesive mass can either by extruded and/or calendered to a uniform thickness on top of the substrated which would be paper, cloth, aluminum foil or glass fabric. The temperature and the throughput of the extrusion are variable depending upon the viscosity of the tackifying mass and the desired coating thickness. Typically the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terphthalic acid, vinyls such as copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum, and alloys thereof can also be employed. In general, the backing employed are those which have heretofore been conventionally employed in preparing pressure sensitive labels, tapes, sheetings and the like and the selection of any particular substrate material is not a specific novel feature of the of the present invention.

DETAILED DESCRIPTION OF THE INVENTION

The advantages of the hot melt adhesive compositions of the present invention can be more readily appreciated by reference to the following examples and tables. Unless otherwise specified, all measurements are in parts per hundred by weight.

EXAMPLE I

Five hundred grams of an EPDM terpolymer (MD-76-5) was dissolved under agitation in 5000 ml. of n-hexane at about 40° C. After all this polymer was dissolved, the solution was cooled to low temperature and 17.22 ml. of active anhydride (182.25 mmoles) was added. After that, while stirring the mixture 6.31 cc of 95% $H_2SO_4$ (11.50 mmoles) was added dropwise, the stirring of the solution was continued for an additional 30 minutes for the sulfonation reaction to complete. After this period, the sulfonation reaction was inactivated by adding 28.63 gm of zinc acetate dissolved in 400/20 ml. mixture of $CH_3OH/H_2O$. Antioxidant 2246 (2.5 gm) was then added to the cement and stirring was continued for an additional 30 minutes. The resultant neutralized sulfonated EPDM terpolymer was isolated by steam stripping. It was then washed with distillated water and pulverized with water in a Waring Blender, followed by filtering by a rubber drum. The final drying of the polymr was done in an aromatic dryer at 100° C.

The sample is identified as neutralized sulfonated EPDM terpolymer 1-2.

The preparation technique of a sulfonated EPDM terpolymer Zn salt having 10 meq. sulfonate groups (Samples 1-1) were the same as above of Sample 1-2. The only difference was in the amount of various chemical ingredients required for the sulfonation and neutralization reaction. The approximate amount of acetic anhydride used (for Sample 1-1) was 8.90 ml (94.50 mmoles), 3.30 $H_2SO_4$ 3.30 cc (58.30 mmoles) and zinc acetate 15.40 gms.

The sulfur analyses on Samples 1-1 and 1-2 was done by Dietert Sulfur analysis and these polymers were found to have sulfonate group of 20 meq. and 10 meq. per 100 gm of sulfonated polymer.

EXAMPLE 2

The neutralized sulfonated EPDM terpolymers of Example I (1-1 and 1-2), and other similarly prepared samples both with higher and lower sulfonation levels and a tackifier resin such as Wingtak Plus or Escorez 1310 were dry blended in the proportion as indicated in Table III and subsequent mixed into a homogeneous blend on a hot two-roll mill at about 150° C. for about 15 minutes. Blends 3-2 and 3-3 incorporate ionic preferential plasticizer stearic acid. Blend 3-4 is one of the formula for hot melt adhesive compositions based on commercial components having excellent properties and is included here for comparative purposes.

DISCUSSIONS

Table IV illustrates various qualitative and quantitative properties of these blends. It can be readily noted that the blends incorporating the sulfonated polymers, Blends 3-1 and 3-2, are not only very tacky but have relatively good green strength. The strength of such materials can be controlled by the proper changes in the formulations and/or by adding the preferential plasticizers and processing oils. Such systems are excellent for various pressure sensitive adhesive applications, especially as hot melt adhesives. Because of their high green strength, these materials will undergo very little creep deformations and thus their shelf use life can be expected to be significantly better over those conventional adhesives. In accordance with their high strength, their high temperature properties will also be improved. And thus for example, laminates prepared using such adhesives will not be expected to distort due to flow of failure if subjected to sudden temperature or pressure changes.

Quantitative numbers on the peel strength of these blends are listed in the fifth column of Table IV.

The peel strength values were obtained by a method similar to ASTM D-429 adhesion test. In brief, the samples were sandwiched between Mylar sheets and pressed to a thickness of about 25 mils using a hot press. Rectangular strips of ½" width and 3" long were cut and 90° peel tests were performed on an Instron at room temperature. The resin-free sections of the Mylar film were clamped into air jaws to avoid any slippage during pulling. The samples were pulled at 5"/min. crosshead speed. The force and elongation of the samples were recorded on a strip recorded. The force necessary to separate the Mylar sheets was taken as the peel strength of the blend. Various runs were made and the average of the initial peak values was recorded and are reported in the fifth column of Table IV.

TABLE III

COMPOSITIONS OF BLENDS OF SULFONATED POLYMERS WITH PETROLEUM RESINS

| Blend # | 3-1 | 3-2 | 3-3 | 3-4* |
|---|---|---|---|---|
| Sulfo EPDM Zn Salt (S ~ 10 meq.) | 50 | — | — | — |
| Sulfo EPDM Zn Salt (S ~ 20 meq.) | — | 50 | — | — |
| Sulfo EPDM Zn Salt (S ~ 30 meq.) | — | — | 50 | — |
| Kraton-1107* | — | — | — | 50 |
| Wingtak Plus | — | — | — | 50 |
| Escorez-1310 | 50 | 50 | 50 | — |
| Stearic Acid | — | 4 | 4 | — |

*This blend is included here for comparative purposes. Kraton 1107 is block copolymer of the structure ABA in which A is a block of styrene (styrene content about 15% by weight) whose number average molecular weight is in the range of 10,000 to 30,000. B is an elastic block of isoprene (isoprene content about 85%) having a number average molecular weight of 100,000.

TABLE IV

QUALITATIVE AND QUANTITATIVE PROPERTIES OF VARIOUS BLENDS OF SULFONATED POLYMERS WITH PETROLEUM RESINS

| Blend # | Green Strength | Tackiness | Clarity | Peel* Strength (Pound-Force) |
|---|---|---|---|---|
| 3-1 | High | Very Tacky | Clear | 9.4 |
| 3-2 | High | Slightly | Light | 1.23 |

TABLE IV-continued

QUALITATIVE AND QUANTITATIVE PROPERTIES OF VARIOUS BLENDS OF SULFONATED POLYMERS WITH PETROLEUM RESINS

| Blend # | Green Strength | Tackiness | Clarity | Peel* Strength (Pound-Force) |
|---|---|---|---|---|
| 3-3 | Very High | Tacky Slightly Tacky | Tan Light Tan | 0.78 |
| 3-4 | High | Tacky | Clear | 11.9 |

*Average value of minimum three measurements

EXAMPLE 3

The flow behavior, or more specifically, the creep resistance characteristics of the adhesive blends is a critical property. In order to assess the creep behavior of our adhesive blends, an experiment, very similar to that of the ASTM D-395, which is a standard test for determining the compression set behavior of elastomers and plastics, was designed. Various sample pads of appropriate thickness were prepared by hot compression molding techniques in between the mylar sheets. The disc-shaped samples were punched out from these pads and were placed under various desired loadings. Before the application of load, the initial thickness of the samples were recorded and the samples rested in a flat surface. The size of the various samples and loadings are listed in Table V. Frequently, at convenient time intervals, the loads from the samples were removed and the height (or the thickness) of the samples were measured. Thickness data, as a function of time, appear in the various columns of Table V. The samples which decrease in height obviously had undergone flow and thus, should have relatively poor creep characteristics. Noting the various numbers of Table V, it is observed that the Blend No. 3-1, which is a blend of the sulfonated EPDM of lowest sulfonate content terpolymer, with the resin showing poor creep resistance, as opposed to the blends which contain higher level sulfonated EPDM polymers. Broadly speaking, this is consistent with our experience with the use of sulfonated polymers in their bulk state, in general. As more and more ionic linkages are introduced, the strength of the sulfonated polymers increases and their creep properties improve. In the adhesive blend systems, this behavior is observed with respect to creep (see Blend No. 3-2 and 3-3) albeit with loss in their tack characteristics, as observed from Table IV. The tack characteristics, however, in some cases, can readily be modified or improved by proper choice of resins, the amount of oil, plasticizers, etc.

Two different sets of experiments employing different size samples were used for determining the creep characteristics of the adhesive blends. Both sets of the data are reported in Table V. Blend No. 3-4 in Table V is based on a block copolymer and hydrocarbon resin and is shown only for comparison. This blend was compression molded and the resultant pad was not uniform in thickness; therefore, the specific thickness values are subject to more error than is the case for the other blends. In any event, it is apparent that this sample does possess rather poor creep resistance, but relatively good peel strength values.

TABLE V

FLOW OR CREEP CHARACTERISTICS OF THE BLENDS OF SULFONATED EPDM'S WITH PETROLEUM RESINS

| Blend # | Thickness of sample (in inches) at Time | | | | | % Change in height in 19 hrs. |
|---|---|---|---|---|---|---|
| | 0-hr. | 1-hr. | 2-hrs. | 3-hrs. | 19-hrs. | |
| (Sample size - Diameter = 0.250 Load = 1000 gms) | | | | | | |
| 3-1 | 0.124 | 0.076 | 0.068 | 0.064 | 0.047 | −62% |
| 3-2 | 0.131 | 0.118 | 0.113 | 0.113 | 0.107 | −18% |
| 3-3 | 0.132 | 0.113 | 0.110 | 0.110 | 0.109 | −17% |
| 3-4 | 0.114 | 0.0650 | 0.063 | 0.057 | 0.050 | −56% |
| (Sample size - Diameter = 0.37"; load = 1000 gms) | | | | | | |
| 3-1 | 0.126 | 0.104 | 0.101 | 0.101 | 0.091 | −28% |
| 3-2 | 0.128 | 0.124 | 0.122 | 0.121 | 0.121 | −5% |
| 3-3 | 0.125 | 0.119 | 0.119 | 0.119 | 0.114 | −9% |
| 3-4 | 0.131 | 0.100 | 0.009 | 0.092 | 0.084 | −36% |

EXAMPLE 4

In this example, Zn sulfonated polybutadiene was added to a sulfonated EPDM terpolymer (Thionic TP-398) having a sulfonation level of a about 10 meq. to investigate the compatibility of these two materials for future use in adhesive or tacky characteristic requiring compounds such as those used in making shoe soles. The Thionic TP-398 was first banded on an electric mill at about 150° C. with a sufficient amount of stearic acid. Subsequently, zinc sulfonated polybutadiene was added slowly and the compound was mixed for about 15 minutes. During this melt state, the blend appeared to be homogeneous. The composition of the blends are shown in Table VI and, its mechanical properties in Table VII. From Table VII, it is observed that the binary blend of these two sulfonated polymers are seriously devoid of tack. The peel strength values of these samples, as determined by the technique mentioned earlier, are negligibly small.

TABLE VI

Composition of Binary Blends of Sulfonated Polybutadiene and Sulfonated Ethylene Propylene Terpolymers

| Blend No. | 4-1 | 4-2 | 4-3 | 4-4 | 4-5 |
|---|---|---|---|---|---|
| Zn Sulfonated Polybutadiene | 100 | 100 | 100 | 25 | 100 |
| Zn Sulfonated EPDM Terpolymer (10 meq. TP 398) | | | 100 | 75 | 100 |
| Stearic Acid | 25 | 50 | 50 | 25 | 100 |

TABLE VII

Properties of Blends of Table VI

| | 4-1 | 4-2 | 4-3 | 4-4 | 4-5 |
|---|---|---|---|---|---|
| Tensile psi | 1655 | 1221 | 631 | 177 | 354 |
| Elongation % | 1250 | 1100 | 975 | 200 | 400 |
| Tackiness | no tack | no tack | no tack | Very slight tack | no tack |
| Peel Strength (lbs-plateau) | .08 | .05 | 17 | .09 | .09 |
| Type of failure | AF | AF | AF | AF | AF |

EXAMPLE 5

In this example, a tackifying resin (Escorez 2101), was added to the master batches of blends of zinc sulfonated polybutadiene and Thionic TP-398 of Table VI to investigate the adhesive characteristics, particularly those of hot melts of these blends. The composition of such blends are listed in Table VIII. Escorez resin 2101 was added to the master batches prepared in Example 4 on a two-roll hot mill at about 100° C. and the compound was mixed for about 15 minutes to achieve a homogeneous mix. To determine the adhesive strength of these blends, films sandwiched in mylar were prepared by compression molding technique at about 250° F. for about 3 minutes. Specimens of the blends without the mylar films were prepared for tensile measurements as before. The various properties of these samples are listed in Table IX. From this table, it is noted that these blends inherently do not possess any significant degree of tack, however, the important point to note is that when these blends are melted and pressed between a substrate, they exhibit a sufficient degree of adhesion. In other words, these blends have a strong potential as hot melt adhesive. Comparing the peel strength values of Table VII with Table IX, it is observed that the blend No. 5-1 has ten-times peel strength over blend No. 4-1. Similarly, blend Nos. 5-3 and 5-5 of Table IX have peel strength over twenty-times of blends 4-3 and 4-5 of Table VII.

TABLE VIII

Composition of Adhesive Formulations of Sulfonated PBD and EPDM with E-2101

| Blend No. | 5-1 | 5-2 | 5-3 | 5-4 | 5-5 |
|---|---|---|---|---|---|
| 4-1 | 100 | | | | |
| 4-2 | | 100 | | | |
| 4-3 | | | 100 | | |
| 4-4 | | | | 100 | |
| 4-5 | | | | | 100 |
| Escorez 2101 | 100 | 100 | 100 | 100 | 100 |

TABLE IX

Physical Properties of Blends of Table VIII

| | 5-1 | 5-2 | 5-3 | 5-4 | 5-5 |
|---|---|---|---|---|---|
| Tensile psi | 740 | 872 | 535 | 277 | 545 |
| Elongation % | 500 | 600 | 510 | 70 | 225 |
| Tackiness | no tack | no tack | no tack | Very little tack | no tack |
| Peel Strength (lbs-plateau) | 1.0 | 14 | 2.4 | 93 | 2.55 |
| Type of failure | AF erratic | AF erratic | AF erratic | AF erratic | AF some transfer |

EXAMPLE 6

Compositions of adhesive blends involving other additives such as oils and waxes were also prepared. Some of such compositions which utilize an oil Tufflo 6056 and carbowax are shown in Table X. For these blends, master batches of Example 5 were used in formulations.

The blend and measuring technique were the same as before. The properties of interest of these blends are shown in Table XI.

TABLE X

Adhesive Blend Compositions Involving Oil and Wax

| Blend No. | 7-1 | 7-2 | 7-3 | 7-4 | 7-5 |
|---|---|---|---|---|---|
| 5-1 | 100 | | | | |
| 5-2 | | 100 | | | |
| 5-3 | | | 100 | | |
| 5-4 | | | | 100 | |
| 5-5 | | | | | 100 |
| Tufflo 6056 | 100 | 100 | 100 | 100 | 100 |
| Carbowax | | | | | 50 |

TABLE XI

Properties of Blends of Table X

| | 7-1 | 7-2 | 7-3 | 7-4 | 7-5 |
|---|---|---|---|---|---|
| Tackiness | very slight tack | very slight tack | tacky | tacky | very tacky |
| Peel Strength (lbs-plateau) | 1.0 | .70 | .45 | 18 | .19 |
| Type of failure | AF some transfer | AF some transfer | AF some transfer | AF | CF |

What is claimed is:

1. A hot melt adhesive composition which comprises:
   (a) a neutralized sulfonated EPDM terpolymer having about 5 to about 50 meq. of neutralized sulfonated groups per 100 grams of said neutralized sulfonated EPDM terpolymer;
   (b) about 25 to about 250 parts by weight of a hydrocarbon resin of a petroleum or coal tar distillate per 100 parts by weight of said neutralized sulfonated EPDM terpolymer; and
   (c) about 25 to about 250 parts by weight of a neutralized sulfonated 1,2-syndiotactic polybutadiene resin per 100 parts of said sulfonated EPDM terpolymer, said sulfonated 1,2-syndiotactic polybutadiene resin having about 5 to about 50 meq. of neutralized sulfonate groups per 100 grams of said neutralized sulfonated 1,2-syndiotactic polybutadiene resin.

2. A hot melt adhesive composition according to claim 2, wherein said sulfonated EPDM terpolymer is derived from an EPDM terpolymer having about 40 to about 65 weight percent of ethylene, of about 25 to about 53 weight percent of propylene and of about 2 to about 10 weight percent of a nonconjugated diene.

3. A hot melt adhesive composition according to claim 2, wherein said nonconjugated diene is 5-ethylidene-2-norbornene.

4. A hot melt adhesive composition according to claim 4, wherein said neutralized sulfonate groups of said sulfonated EPDM terpolymer are neutralized with a counterion selected from the group consisting of ammonium, aluminum, antimony, iron, lead and Groups IA, IIA, IB and IIB of the Periodic Table of Elements.

5. A hot melt adhesive composition according to claim 5, wherein said neutralized sulfonate groups of said sulfonated EPDM terpolymer are neutralized with zinc ions.

6. A hot melt adhesive according to claim 1 further including about 1 to about 50 parts by weight of an ionic preferential plasticizer per 100 parts by weight of said neutralized sulfonated EPDM terpolymer, wherein said preferential plasticizer is selected from the group consisting of carboxylic acids having about 8 to about 22 carbon atoms, metallic salts of said carboxylic acids, amides having an aliphatic group of about 8 to about 22 carbon atoms, amines, ureas and thioureas and mixtures thereof.

7. A hot melt adhesive composition according to claim 6, wherein said sulfonated neutralized EPDM terpolymer contains about 7 to about 20 meq. of neutralized sulfonated groups per 100 grams of polymer.

8. A hot melt adhesive according to claim 7, wherein said preferential plasticizer is said metallic salt of said carboxylic acid.

9. A hot melt adhesive composition according to claim 8, wherein said metallic salt of said carboxylic acid is zinc stearate.

10. A hot melt adhesive composition according to claim 1 or 6 further including about 1 to about 150 parts by weight of a filler per 100 parts by weight of said neutralized sulfonated EPDM terpolymer, said filler being selected from the group consisting of calcium carbonates, silicas, carbon blacks, clays and talcs and mixtures thereof and/or less than about 100 parts by weight of an oil having less than 2 weight percent polars per 100 parts by weight of said neutralized sulfonated EPDM terpolymer.

11. A hot melt adhesive composition according to claim 1 or 8 wherein said hydrocarbon resin has about 5 to 6 carbon atoms and consists of aliphatic dienes, mono- and diolefins and cyclic olefins.

* * * * *